United States Patent [19]

Shibata et al.

[11] Patent Number: 5,077,326

[45] Date of Patent: Dec. 31, 1991

[54] UNSATURATED POLYESTER COMPOSITIONS MOLDING MATERIALS THEREFROM AND MOLDED PRODUCTS THEREFROM

[75] Inventors: Takashi Shibata; Koichi Akiyama, both of Osaka; Sanzi Aoki, Nara; Yasuhiro Mishima, Aichi; Hisayuki Iwai, Aichi; Ken Hatta, Aichi, all of Japan

[73] Assignee: Toyota Jidosha Kabushiki Kaisha, Aichi, Japan

[21] Appl. No.: 363,215

[22] Filed: Jun. 8, 1989

[30] Foreign Application Priority Data

Jun. 14, 1988 [JP] Japan ................................ 63-146253

[51] Int. Cl.⁵ .............................................. C08L 67/06
[52] U.S. Cl. ..................................... 523/523; 523/526; 523/527; 525/27; 525/44; 525/48; 525/168; 525/170; 525/171

[58] Field of Search ..................... 525/27, 44, 48, 168, 525/170, 171; 523/523, 526, 527

[56] References Cited

U.S. PATENT DOCUMENTS 4,100,229 7/1978 Schwartz ............................ 525/44

*Primary Examiner*—Patricia Short
*Attorney, Agent, or Firm*—Heller, Ehrman, White & McAuliffe

[57] ABSTRACT

A quickly curable unsaturated polyester composition with high surface quality contains an unsaturated polyester, a vinyl monomer, either an alkane polyol polyacrylate or an alkane polyol polymethylacrylate, a thermoplastic resin, and one or more curing catalysts selected from t-butylperoxy benzoate, t-butylperoxy octoate and 2,5-dimethyl-2,5-di(benzoilperoxy) hexane. Molding compounds are obtained by impregnating glass fibers with such composition and molded products obtained by curing such molding material have improved surface smoothness.

3 Claims, 1 Drawing Sheet

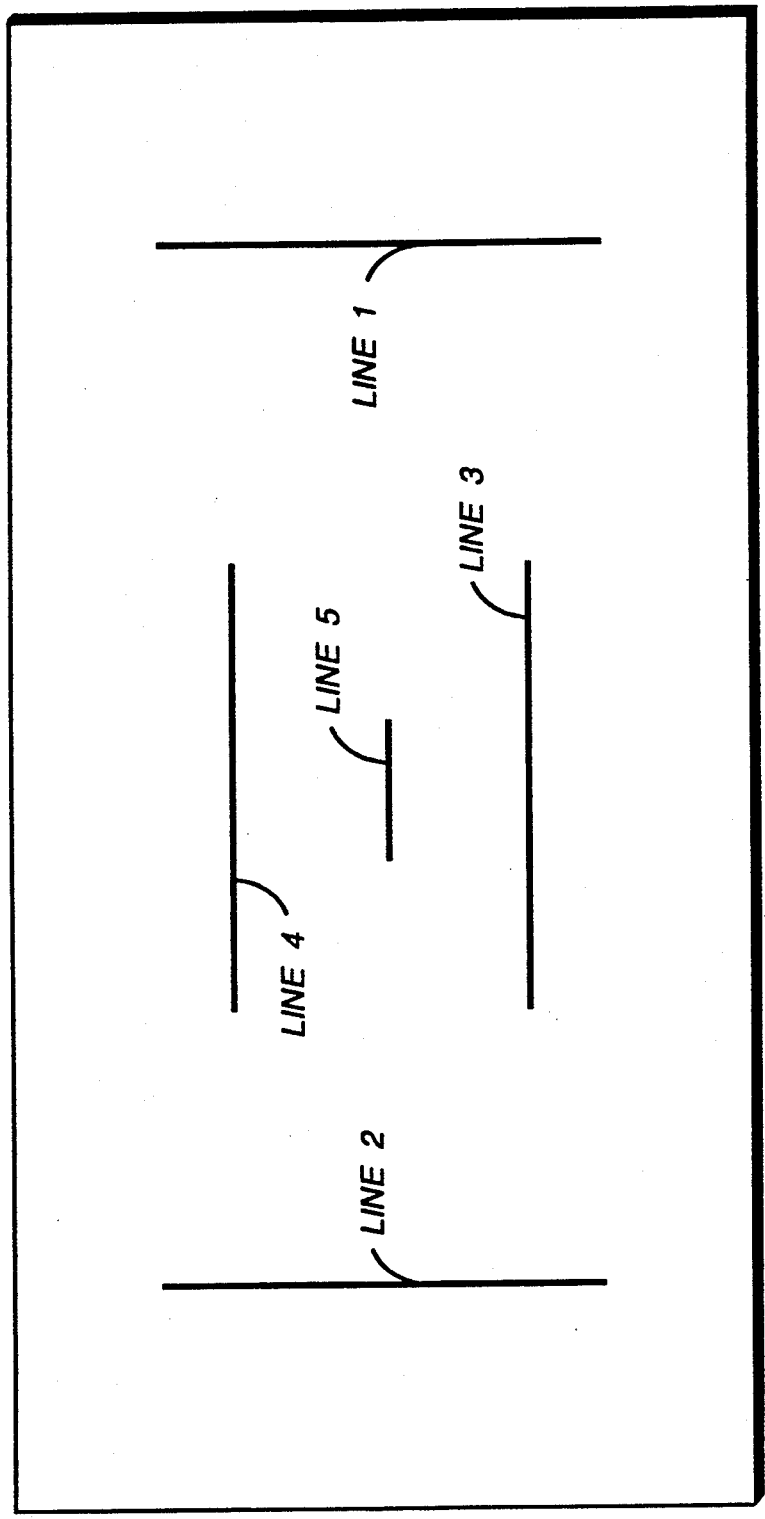

UNSATURATED POLYESTER COMPOSITIONS MOLDING MATERIALS THEREFROM AND MOLDED PRODUCTS THEREFROM

BACKGROUND OF THE INVENTION

This invention relates to unsaturated polyester compositions which are capable of providing superior surface quality and quickly curable. This invention also relates to sheet molding compounds and bulk molding compounds containing fiber reinforcements.

Fiber-reinforced plastics (FRP) based on unsaturated polyester resins have superior characters not only regarding mechanical strength, heat, water and chemical resistance but also regarding productivity, and are applied extensively to bathtubs, water tank panels and bathroom sinks. Recently, unsaturated polyester sheet molding compounds (SMC) and bulk molding compounds (BMC) are recognized as plastic materials for automotice exterior body panels and are applied not only to main exterior panels such as engine hoods, roofs and trunk lids, but also for other exterior parts such as spoilers, air intakes and rocker panels. The SMC and BMC to be used for automotive exterior panels are particularly required to have superior surface quality and fast curing property. If the curing speed of SMC can be increased even by seconds, for example, this alone can improve productivity significantly. For this reason, there have been several proposals for quick cure catalysts (such as disclosed in U.S. Pat. No. 4,278,558), but surface smoothness of SMC is often lost if its curability is increased. It has been known to use thermoplastic resins such as polymethyl methacrylate, polyvinyl acetate, styrene-butadiene block copolymers and lactone-conjugated diene block copolymers for improving surface smoothness (as disclosed, for example, in Japanese Pat. Publication Tokkai 52-148588 and U.S. Pat. 4,287,313). Although surface smoothness of molded products can be improved by using such low profile additives, it is not sufficient if the curing speed is increased.

SUMMARY OF THE INVENTION

It is therefore an object of the present invention to provide molding materials with balanced curing speed of SMC and surface quality of products.

The present invention has been completed by the present inventors as a result of their diligent studies in view of the above and other objects and is based on their discovery that molded products with superior surface quality can be obtained from compositions which include an unsaturated polyester, a vinyl monomer, alkane polyol polyacrylate or alkane polyol polymethacrylate, a thermoplastic resin and a curing catalyst of a specified kind.

BRIEF DESCRIPTION OF THE DRAWING

The accompanying Figure which shows a method of measuring surface smoothness is incorporated in and forms a part of the specification and, together with the description, serves to explain the invention.

DETAILED DESCRIPTION OF THE INVENTION

This invention relates firstly to quickly curable unsaturated polyester compositions with high surface quality, comprising an unsaturated polyester (hereinafter referred to as a first component), a vinyl monomer (hereinafter referred to as a second component), alkane polyol polyacrylate or alkane polyol polymethacrylate (hereinafter referred to as a third component), a thermoplastic resin (hereinafter referred to as a fourth component), and at least one curing catalyst (initiator) selected from t-butylperoxy benzoate, t-butylperoxy octoate and 2,5-dimethyl-2,5di(benzoilperoxy)hexane. The invention relates secondly to molding materials obtainable by impregnating such unsaturated polyester compositions in glass fibers and thirdly to molded products obtained from such molding materials. Compositions embodying the present invention not only have superior mechanical strength, heat, water and chemical resistance but also such valuable characteristics as surface quality (surface smoothness and paintability) and quick curability (productivity) that are necessary in particular for application to automotive exterior body panels. Moreover, SMCs and BMCs based on the composition, containing 10–40% by weight of glass fibers (of length, for example, ¼ to 4 inches) and 10–50% by weight of a filler such as calcium carbonate, are particularly useful as molding materials for exterior body panels and other external parts. In addition, not only have the molding materials of the present invention fast curing property but also the surfaces of the molded products therefrom have extremely superior surface smoothness (very little bumpiness and waviness at ribs and embossed areas). Unsaturated polyesters which may be used in connection with the present invention (the first components) can be synthesized by condensation of $\alpha,\beta$-olefinic unsaturated dicarboxylic acid and glycol and have hitherto been used frequently. For their synthesis, saturated dicarboxylic acids, aromatic dicarboxylic acids are used. Dicyclopentadiene which reacts with carboxylic acids may also be used together with these two components. Examples of $\alpha,\beta$-unsaturated dicarboxylic acid include maleic acid, fumaric acid, itaconic acid, citraconic acid and anhydrides of these dicarboxylic acids. Examples of dicarboxylic acid which may be used together with such an $\alpha,\beta$-olefinic unsaturated dicarboxylic acid include adipic acid, sebacic acid, succinic acid, gluconic acid, phthalic anhydrides, o-phthalic acid, isophthalic acid, terephthalic acid, tetrahydro-phthalic acid and tetrachlorophthalic acid. Examples of divalent glycol include alkanediol, oxaalkanediol and bisphenol-A added with ethylene oxide or propylene oxide. In addition, monools and trivalent triols may be used. Examples of alkanediol include ethylene glycol, 1,2-propylene glycol, 1,3-propylene glycol, 1,3-butanediol, 1,4-butanediol, neopentyl glycol, 1,5-pentanediol, 1,6-hexanediol and cyclohexanediol. Examples of oxaalkanediol include dioxyethylene glycol and trioxyethylene glycol. Examples of monovalent or trivalent alcohol include octyl alcohol, oleyl alcohol and trimethylol propane. Synthesis of unsaturated polyester usually takes place with heating while water as by-product is removed. Unsaturated polyesters with average molecular weight of 800–4000 and acid value of 20–60 are generally used in connection with the present invention. Examples of vinyl monomers to be used in connection with the present invention (the second components) include monovinyl monomers which have hitherto been used commonly as a diluent or a cross-linking agent for the aforementioned first components, including aromatic monovinyl monomers such as styrene, p-chlorostyrene and vinyl toluene and acrylic monovinyl monomers such as acrylic acid, methyl acrylate, methacrylic acid, methyl methacrylate and acrylonitrile. The second component is usually compounded with the first and fourth components as their diluent.

Examples of the aforementioned third component include dimethacrylates and diacrylates of alkanepolyol having 2-12 carbon atoms such as ethylene glycol dimethacrylate, diethylene glycol dimethacrylate, triethylene glycol dimethacrylate, propylene glycol dimethacrylate, dipropylene glycol dimethacrylate, 1,4-butanediol dimethacrylate, neopentyl glycol dimethacrylate, 1,6-hexanediol dimethacrylate, ethylene glycol diacrylate, propylene glycol diacrylate, 1,3-propanediol diacrylate, 1,4-butanediol diacrylate, neopentyl glycol diacrylate, 1,6-hexanediol diacrylate, triethylene glycol diacrylate, trimethylol propane dimethacrylate, glycerine dimethacrylate, pentaerythritol dimethacrylate and trimethylol propane diacrylate. Additional examples include polymethacrylates and polyacrylates of alkanepolyol having 3-12 carbon atoms such as trimethylol propane trimethacrylate, glycerine trimethacrylate, pentaerythritol trimethacrylate, glycerine triacrylate, trimethylol propane triacrylate, pentaerythritol triacrylate, pentaerythritol tetramethacrylate, dipentaerythritol hexamethacrylate, pentaerythritol tetraacrylate and dipentaerythritol hexaacrylate. The third component of the present invention may be considered to improve the elasticity of the resins at the time of molding, contributing to the hardness and smoothness of the surface of the molded product.

The fourth component according to the present invention may be a thermoplastic resin which has hitherto been used commonly as low profile additives for unsaturated polyester resins. Examples of such resins include polybutadienes and their hydrogen adducts, polyisoprenes and their hydrogen adducts, aromatic vinyl-conjugate diene block copolymers and their hydrogen adducts, polystyrene, styrene-vinyl acetate block copolymers, polyvinyl polyacetates and polymethyl methacrylate. Additional examples include saturated polyesters and polyethers. The aforementioned aromatic vinyl-conjugate diene block copolymers are themselves polymers of a well known type and can be synthesized by a known block copolymerization method from an aromatic vinyl monomer and a conjugate diene monomer such as butadiene and isoprene. Examples of such block copolymer include styrene-butadiene block copolymer and styrene-isoprene block copolymer. For the purpose of the present invention, block copolymers with the mole ratio between the vinyl monomer and the diene monomer in the range of about 50:50 -5:90 and average molecular weight in the range of about 30,000 -200,000 are preferable.

The thermoplastic resin to be used in connection with the present invention may be carboxyl-modified. Polymers with a carboxylic group introduced thereto have not only improved compatibility with unsaturated polyester resins but also improved thickening speed by the action of magnesium oide. The polyester resin compositions according to the present invention can provide compositions with superior surface quality if the aforementioned first through fourth components are compounded at an appropriate ratio. It is preferable that 20-40 weight parts or more preferably 25-35 weight parts of the first component, 40-60 weight parts or more preferably 40-55 weight parts of the second component, 1-15 weight parts or more preferably 5-10 weight parts of the third component and 10-30 weight parts or more preferably 10-25 weight parts of the fourth component make up a total of 100 weight parts. If the ratio is not within the ranges given above, a resin composition with high surface quality cannot be obtained. If the content of the third component is less than 1 weight part, in particular, the resin components do not cross-link sufficiently and the molded product loses strength at high temperatures, producing waviness. If its content exceeds 15 weight parts, on the other hand, smoothness of the molded product is adversely affected due to too much cross-linking in the resin components.

As explained above, one or more curing catalysts (initiators) are selected from t-butylperoxy benzoate (TBPB), t-butylperoxy octoate (TBPO) and 2,5- dimethyl-2,5-di(benzoil peroxy)hexane (DDBPH). If only one of them is to be used, TBPB and DDBPH are preferred. If two or more of them are used in a combination, it is preferable that TBPO is less than 30% of the total amount of the initiator. The amount of initiator to be used according to the present invention is 1-5 weight parts and preferably 1.5-3 weight parts for the aforementioned 100 weight parts of the first through fourth resin components.

In addition to the initiator mentioned above, it is preferable to use an accelerator. Examples of accelerator include organic compounds of cobalt, copper and manganese such as their octoates, naphthenates and acetylacetonates. They may be used either singly or in combination. They are used at the rate of 10-1000ppm as metal per 100 weight parts of the resin composition.

If necessary, fillers, retarders, pigments and thickeners may be added to the resin compositions of the present invention. Examples of filler include calcium carbonate, talc, silica, clay, glass powder and glass balloons. Examples of retarders include parabenzoquinone and t-butyl catechol. Examples of pigment include titanium dioxide, carbon black, iron oxide red and phthalocyanine blue. Examples of thickeners include oxides and hydroxides of magnesium and calcium.

SMC and BMC can be produced by known methods and by using known apparatus to impregnate glass fibers (for example, of diameter about 8-20μ and length ¼-4 inches) with these compositions containing various components. Glass fibers are usually provided so as to be about 10-40% by weight of the total composition. SMC and BMC of the present invention are heated and compression molded (at pressure of 50-120kgf/cm$^2$ and temperature of 110-180° C.) to produce molded products.

Unsaturated polyester resin compositions of the present invention as well as molding materials obtained by impregnating glass fibers with such compositions cure fast and hence have high productivity. Moreover, since molded products obtained therefrom have superior surface smoothness, they are extremely useful, for example, for automotive exterior body panels. In what follows, results of experiments on test examples (1-11) and comparison examples (1-2) are presented to describe the present invention more clearly.

Test Results

SMCs (Test Examples 1-11 and Comparison Examples 1-2) were prepared with compositions shown in Table 1. Unsaturated polyester resin A was synthesized from propylene glycol and maleic acid. It contained 30% of styrene, its viscosity at 25° C. was 820cps and its acid value was 16.5. Unsaturated polyester B was synthesized from 0.7mol of propylene glycol, 0.3mol of dicyclopentadiene and 1.0mol of maleic acid anhydride.

It contained 35% of styrene, its viscosity at 25° C. was 650cps and its acid value was 21. The styrene-butadiene those for Comparison Examples 1-2, indicating their superior surface smoothness.

TABLE 1

|  | Ex. 1 | Ex. 2 | Ex. 3 | Ex. 4 | Ex. 5 | Ex. 7 | Ex. 8 | Ex. 9 | Ex. 10 | Ex. 11 | Comp. 1 |
| --- | --- | --- | --- | --- | --- | --- | --- | --- | --- | --- | --- |
| (I) Composition (parts by weight) | | | | | | | | | | | |
| (a) Unsaturated polyester A | 30 | — | 30 | 30 | 30 | 30 | 30 | 30 | 30 | 30 | 30 |
| Unsaturated polyester B | — | 30 | — | — | — | — | — | — | — | — | — |
| (b) Styrene | 50 | 50 | 50 | 45 | 50 | 50 | 50 | 50 | 50 | 50 | 55 |
| (c) Trimethylol propane trimethylacrylate | 5 | 5 | 5 | 10 | — | 5 | 5 | 5 | 5 | 5 | — |
| Trimethylol propane triacrylate | — | — | — | — | 5 | — | — | — | — | — | — |
| 1,4-butanediol dimethacrylate | — | — | — | — | — | — | — | — | — | — | — |
| (d) Styrene-butadiene block copolymer | 15 | 15 | — | 15 | 15 | 15 | 15 | 15 | 15 | 15 | 15 |
| polyvinyl acetate | — | — | 15 | — | — | — | — | — | — | — | — |
| (e) t-butylperoxy benzoate | 1.0 | 1.0 | 1.0 | 1.0 | 1.0 | 1.5 | — | 1.0 | 1.2 | — | 1.0 |
| t-butylperoxy octoate | 0.2 | 0.2 | 0.2 | 0.2 | 0.2 | — | — | — | 0.3 | 0.3 | 0.2 |
| 2,5-dimethyl-2,5-di(benzoilperoxy)hexane | 0.3 | 0.3 | 0.3 | 0.3 | 0.3 | — | 1.5 | 0.5 | — | 1.2 | 0.3 |
| 1,1-bis(t-butylperoxy)-3,3,5-trimethylcyclohexane | — | — | — | — | — | — | — | — | — | — | — |
| (f) Cobalt naphthalene | 0.05 | 0.05 | 0.05 | 0.05 | 0.05 | 0.05 | 0.05 | 0.05 | 0.05 | 0.05 | 0.05 |
| (g) P-benzoquinone | 0.01 | 0.01 | 0.01 | 0.01 | 0.01 | 0.01 | 0.01 | 0.01 | 0.01 | 0.01 | 0.01 |
| (h) Calcium carbonate | 180 | 180 | 180 | 180 | 180 | 180 | 180 | 180 | 180 | 180 | 180 |
| (i) Magnesium oxide | 1.0 | 1.0 | 1.0 | 1.0 | 1.0 | 1.0 | 1.0 | 1.0 | 1.0 | 1.0 | 1.0 |
| (j) Glass fibers (diameter 13μ, length 1 inch) | 110 | 110 | 110 | 110 | 110 | 110 | 110 | 110 | 110 | 110 | 110 |
| (II) Curing properties of SMC (140° C.) | | | | | | | | | | | |
| Gelation time/Curing time (sec) | 35/45 | 35/45 | 34/43 | 34/42 | 35/46 | 37/48 | 36/46 | 36/46 | 34/43 | 34/42 | 36/49 |
| Curing time - Gelation time | 10 | 10 | 9 | 8 | 11 | 11 | 10 | 10 | 9 | 8 | 13 |
| (III) Molded Products | | | | | | | | | | | |
| (a) Molding condition Temperature (°C.)/keep time (sec) | 150/50 | 150/50 | 150/50 | 150/50 | 150/50 | 150/50 | 150/50 | 150/50 | 150/50 | 150/50 | 150/50 |
| (b) Surface characteristics Average deviation from 5th-order regression (μ) | 2.6 | 2.8 | 3.4 | 2.5 | 2.7 | 2.7 | 2.5 | 2.5 | 2.8 | 2.9 | 8.7 |
| Surface roughness (μ) | 1.0 | 1.2 | 0.5 | 1.4 | 1.1 | 0.9 | 1.1 | 1.0 | 1.2 | 1.3 | 3.4 |
| (c) Hardness (Rockwell hardness M scale) | 77 | 76 | 78 | 80 | 75 | 76 | 77 | 76 | 78 | 80 | 69 | block copolymer solution consisted of 30 weight parts of copolymer and 70 weight parts of styrene and its viscosity at 25° C. was 28,000cps. This copolymer had average molecular weight of 120,000 and consisted of 15wt% of styrene and 85wt% of butadiene, having 0.5wt% of carboxyl groups. Each SMC was compressed under specified conditions with flow time of 9 seconds under a pressure of 80kg/cm² to produce a molded product in the shape of a plate (of dimensions 500 ×1000 ×2mm) as shown in Figure. Comparison Example 1 is a product from a material not containing the aforementioned third component which is an essential ingredient according to the present invention. Comparison Example 2 is a product obtained by using imitators outside the range specified according to the present invention.

Surface characteristics of these molded products were examined by a three-dimensional tester (Microcord FJ604 produced by Mityutoyo, Inc.). Three-dimensional (X, Y, Z) values were first measured along the four lines 1, 2, 3 and 4 at 300 points (pitch = 1.0mm). Fifth-order regression curves were calculated from the Z-values of the individual points to determine the cross-sectional shape and the average deviations (μ) of the individual Z-values from the curves were obtained. Surface roughness was measured along the line 5. The results of these measurements are shown in Table 1. Table 1 clearly demonstrates that the SMC products according to the present invention have extremely smaller values of average deviation and roughness than

What is claimed is:

1. A quickly curable unsaturated polyester composition with high surface quality, comprising
   an unsaturated polyester as a first component,
   a monovinyl monomer as a second component,
   a third component selected from the group consisting of alkane polyol polyacrylate and alkane polyol polymethacrylate,
   a thermoplastic resin that can function as a low profile additive as a fourth component, and
   at least one hardening catalyst selected from the group consisting of t-butylperoxy benzoate, t-butylperoxy octoate and 2,5-dimethyl-2,5-di(benzoilperoxy)hexane,
   said composition containing 20-40 weight parts of said first component, 40-60 weight parts of said second component, 1-15 weight parts of said third component, and 10-30 weight parts of said fourth component such that the total of said weight parts is 100 weight parts.

2. A molding material comprising glass fibers and a quickly curable unsaturated polyester composition with high surface quality impregnating said glass fibers, said unsaturated polyester composition comprising
   an unsaturated polyester as a first component,
   a monovinyl monomer as a second component,
   a third component selected from the group consisting of alkane polyol polyacrylate and alkane polyol polymethacrylate, a thermoplastic resin that can function as a low profile additive as a fourth component, and at least one hardening catalyst selected from the group consisting of t-butylperoxy benzoate, t-butylperoxy octoate and 2,5-dimethyl-2,5-di(benzoilperoxy)hexane, said unsaturated polyester composition containing 20-40 weight parts of said first component, 40-60 weight parts of said second component, 1-15 weight parts of said third component, and 10-30 weight parts of said fourth component such that the total of said weight parts is 100 weight parts.

3. A molded product obtained by hardening a molding material which comprises glass fibers and a quickly curable unsaturated polyester composition with high surface quality impregnating said glass fibers, said unsaturated polyester composition comprising an unsaturated polyester as a first component, a monovinyl monomer as a second component, a third component selected from the group consisting of alkane polyol polyacrylate and alkane polyol polymethacrylate, a thermoplastic resin that can function as a low profile additive as a fourth component, and at least one hardening catalyst selected from the group consisting of t-butylperoxy benzoate, t-butylperoxy octoate and 2,5-dimethyl-2,5-di(benzoilperoxy)hexane, said unsaturated polyester composition containing 20-40 weight parts of said first component, 40-60 weight parts of said second component, 1-15 weight parts of said third component, and 10-30 weight parts of said fourth component such that the total of said weight parts is 100 weight parts.

* * * * *

UNITED STATES PATENT AND TRADEMARK OFFICE
CERTIFICATE OF CORRECTION

PATENT NO. : 5,077,326

DATED : December 31, 1991

INVENTOR(S) : Takashi Shibata, et al

It is certified that error appears in the above-identified patent and that said Letters Patent is hereby corrected as shown below:

On the title page: Item [73] Assignees, Toyota Jidosha Kabushiki Kaisha, Aichi, Japan; and Takeda Chemical Industries, Ltd., Osaka, Japan--

Signed and Sealed this

Twenty-sixth Day of January, 1993

*Attest:*

DOUGLAS B. COMER

*Attesting Officer* — *Acting Commissioner of Patents and Trademarks*